March 4, 1969 YASUO NANNICHI 3,431,513
TWIN SEMICONDUCTOR LASER
Filed Sept. 27, 1965
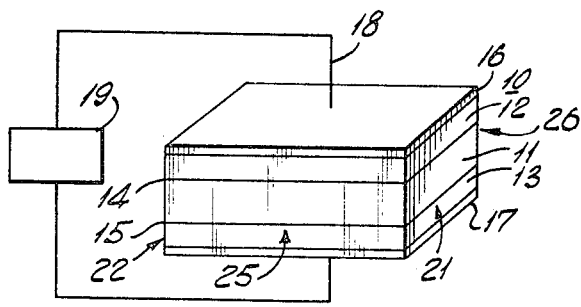
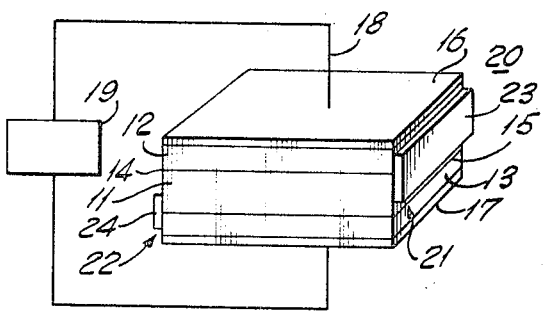
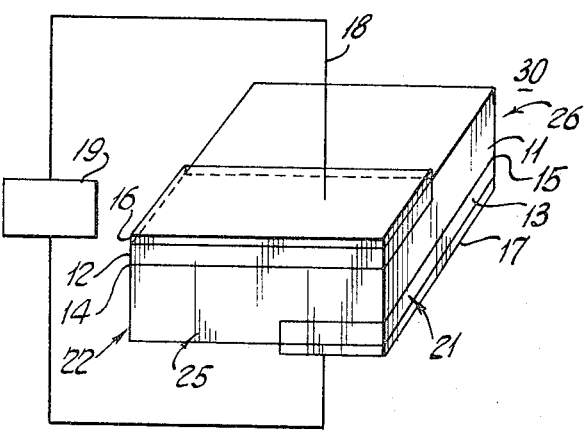
INVENTOR
YASUO NANNICHI
BY
Hopgood & Calimafde
ATTORNEYS

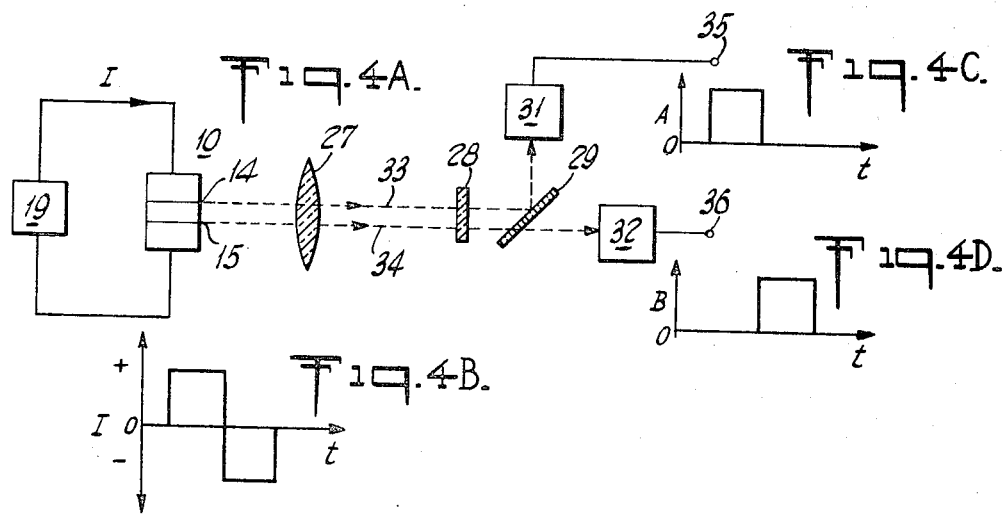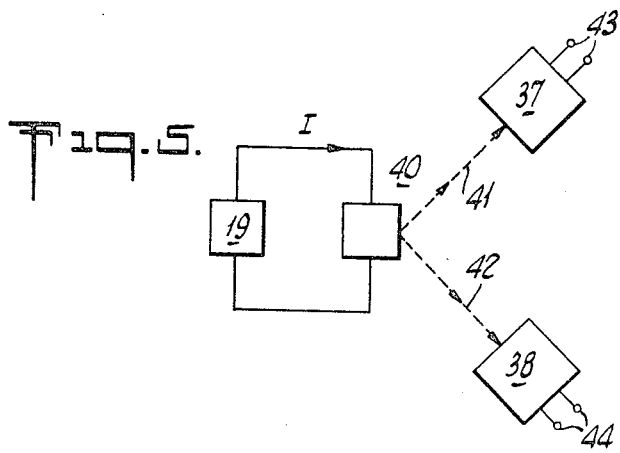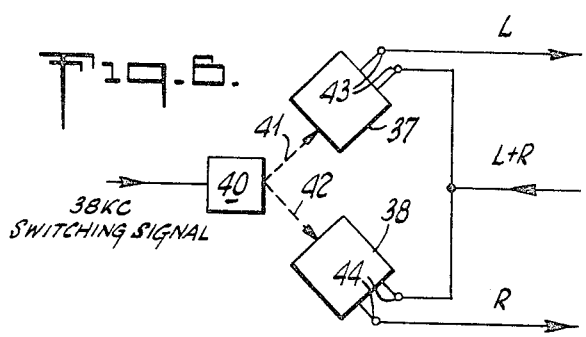

United States Patent Office 3,431,513
Patented Mar. 4, 1969

3,431,513
TWIN SEMICONDUCTOR LASER
Yasuo Nannichi, Tokyo, Japan, assignor to Nippon Electric Company, Limited, Tokyo, Japan, a corporation of Japan
Filed Sept. 27, 1965, Ser. No. 490,521
Claims priority, applications Japan, Sept. 28, 1964, 39/55,439, 39/55,440
U.S. Cl. 331—94.5       1 Claim
Int. Cl. H01s 3/16; H03k 19/14, 23/12

This invention relates to semiconductor elements of the electroluminescent type and more particularly to a novel structure provided for such elements which are capable of use as circuit elements in optoelectronic circuits of various kinds.

It is well known that when a P-N junction for performing the radiative recombination of charged carriers is formed in a Group III-V compound semiconductor and the end faces of the semiconductor which are perpendicular to the P-N junction are made plane and optically parallel and are polished to a high degree of accuracy so as to establish an optical resonator together with the P-N junction, the junction will generate efficient luminescence as a forward current is passed through the junction.

Such a semiconductor element is commonly referred to as a semiconductor laser, and is described in the technical journal, "Applied Physics Letters" vol. 1, No. 3, p. 62.

The emission wavelengths of semiconductor lasers are affected by various factors such as the type of semiconductor material of which the laser is made, the operating conditions, and the manufacturing method, however, all semiconductor lasers are alike in that luminescence scarely occurs when a backward current flows through the P-N junction.

The use of such semiconductor lasers in optoelectronic circuits which perform logic operations such as amplification, oscillation, and switching has been attempted by some researchers. With such circuits, however, it was found that a pair of semiconductor lasers was required instead of a single unit, which in turn necessitated installation of a pair of optical systems. This of course prevented miniaturization of the apparatus package.

Accordingly, it is an object of this invention to provide a twin semiconductor laser capable of functioning in a manner similar to a pair of semiconductor lasers.

Another object of the invention is to provide a twin semiconductor laser capable of changing the direction or directions of emission or emitting luminescence of different wavelengths, or both, as the direction of current conducted in the element is reversed.

All of the objects, features and advantages of this invention and the manner of attaining them will become more apparent and the invention itself will be best understood by reference to the following description of an embodiment of the invention taken in conjunction with the accompanying drawing, in which:

FIG. 1 shows a perspective view of a twin semiconductor laser according to one embodiment of the invention, FIGS. 2 and 3 show perspective views of twin semiconductor lasers illustrating two further embodiments of the invention, FIG. 4A shows a schematic block diagram for an optoelectronic circuit which employs a twin semiconductor laser according to the invention, FIG. 4B is a waveform diagram illustrating an example of the input signal applied to the circuit of FIG. 4A, FIGS. 4C and 4D are waveform diagrams illustrating the output signal produced when the input signal as shown in FIG. 4B is applied to the circuit of FIG. 4A, and FIGS. 5 and 6 show schematic block diagrams for two different optoelectronic cricuits each containing a twin semiconductor laser made according to this invention.

This invention is based on the facts that whereas highly efficient emission occurs when a forward current is conducted through a P-N junction in a semiconductor laser, luminescence from the P-N junction is substantially eliminated for a backward current, and that the wavelength of emission thus generated from the P-N junction can be substantially varied when either the manufacturing or operating conditions are varied.

In accordance with this invention, the above described phenomena is employed in the construction of a twin semiconductor laser having a P-N-P or an N-P-N structure composed of a Group III-V compound semiconductor as the substrate, with two parallel P-N junction planes formed therein, and two sets of optical resonators consisting of the two sets of parallel side faces. With such a twin semiconductor laser, two kinds of luminescence differing in wavelength from one another can be emitted alternately from the P-N junctions by reversal of the current direction, provided that the formation methods, the types of impurities, and the impurity concentrations of individual regions of the P-N-P or N-P-N structure have been suitably controlled.

With such a laser element, it is possible to provide two output luminescent signals differing in wavelength, merely by reversing the direction of current flowing in the element. By detecting the two luminescent signals through optical filters, the two signals can be readily discriminated from one another. Thus such an element can be successfully employed in "light" communication equipment which operates on the same principle as the frequency-shift system in radio communication.

Furthermore, if the light output directions of the two resonators are made different from each other, two light outputs differing in the direction of emission can be produced by changing the direction of current flow. Such an element is suitable for optical switching application.

The principles and features of the present invention will become more apparent from the following description taken in conjunction with the drawings which illustrate several embodiments of the twin semiconductor laser according to this invention.

Referring now to FIG. 1, there is shown a perspective view of a twin semiconductor laser 10 as one embodiment of the invention. The structure of the laser 10 is composed of a layer 11 of a single crystal N-type III-V compound semiconductor, for example, gallium arsenide (GaAs), a P-type GaAs epitaxial crystal layer 12 being formed on one face of the layer 11. A first P-N junction 14 is formed between the layers 11 and 12. A P-type diffused layer 13 is formed on the opposite side of the N-type layer 11 from the layer 12 with a second P-N junction 15 between the layers 11 and 13. Metallic films 16 and 17 are plated to the top surface of the P-type epitaxial layer 12 and the bottom surface of the P-type diffused layer 13 respectively, to form a pair of electrodes. These metallic film electrodes 16 and 17 must be provided with suitable leads 18 for connection to a current control circuit 19.

An example of a process for manufacturing the luminescent element 10 will now be described. First, an N-type GaAs wafer containing tellurium of the order of $1 \times 10^{18}$ atoms/cm.$^3$ is vacuum-sealed in a quartz vessel having an inside volume of approximately 10 cm.$^3$ together with approximately 10 milligrams of zinc arsenide ($ZnAs_2$) and is subjected to a diffusion process for about three hours at approximately 850° C. The resulting thickness of the P-type diffused layer 13 is approximately 50 microns. After the diffusion process, the GaAs wafer is withdrawn from the vessel and one side surface is lapped to finish the thickness of the total wafer to the order of 100 microns.

Second, a mixture of approximately 5 grams of tin and 0.2 gram of zinc is placed into a quartz boat and heated to approximately 600° C. in a hydrogen furnace. After the mixture is well melted, the lapped surface of the GaAs wafer is brought into contact with the liquid surface of the melt. Subsequently, the liquid temperature is raised to about 620° C. and this state is maintained for about two minutes so that the epitaxial growth may be carried out successfully. This is followed by decreasing the liquid temperature gradually to about 400° C. in 20 minutes, which results in the formation of the grown P-type epitaxial layer 12 of about 25 microns in thickness, over the lapped surface.

The conventional technique used in constructing an ordinary semiconductor laser may be used to obtain a large number of pellets, each in the form of a parallelepiped approximately 0.125×0.1×0.5 mm. on the edges thereof and surrounded by reflective planes such as 21 and 22 which are perpendicular to the longitudinal axis, by rough or smooth side planes such as 25 and 26, and by top and bottom planes for application of a pair of electrodes. As the next step, alloy films 16 and 17, each approximately 3 microns thick and consisting of equal weights of gold and tin, are deposited on the top and bottom faces of the parallelepiped through a vacuum evaporation process. The twin semiconductor laser 10 is finished by subjecting this assembly to a heating process for approximately three minutes at 450° C. in a hydrogen stream to provide ohmic contacts and finally connecting electric leads 18 to the electrodes.

Our experimental results with this laser were as follows. A 500 ma. pulse current of 1 microsecond duration was applied across the crystal layer 12 and the diffused layer 13 from the current control circuit 19 with the laser 10 held at 77° K., the layer 12 being positive and the layer 13 negative. Under these conditions, emission occurred from the first P-N junction 14 and the wavelength thereof was approximately 8800 A. Emission for the reverse current was produced from the second or epitaxial junction 15 and the wavelength thereof was approximately 8400 A.

Our experiments also showed that such an effect can be produced by providing a temperature difference between the first and second junctions, provided they are formed by the same method. Suppose now that a twin semiconductor laser having a structure similar to that shown in FIG. 1 is constructed in the same way as in the previous example except that both of the P-type regions 12 and 13 are formed by a simultaneous diffusion process with the same thickness of 25 microns and that the thickness of the crystal layer 11 is made 100 microns. With the electrodes 16 and 17 on the opposite sides of this P-N-P junction semiconductor laser maintained at 77° K. and 200° K., the temperature of the junctions 14 and 15 will be approximately 130° K. and 240° K., respectively. Under such condition, when a 10 ampere pulse current of 50 nanoseconds duration is conducted in this laser 10 in the forward direction from the current control circuit 19, i.e. with the electrode 16 positive and the electrode 17 negative, emission of laser light at a wavelength of 8550 A. is observed from the first junction 14, for the reverse current, laser light at 8800 A. is emitted from the second junction 15. Thus the wavelengths of emission from the two junctions can be made different from one another by suitably changing either the manufacturing or the luminescence operating condition of one of the two junctions with respect to the other junction.

A description will next be made of a second and a third embodiment of the twin semiconductor laser according to this invention, both having such a structure that the output light directions of the laser for two current directions of current flow can be made different from one another by making the output directions of the two resonators different.

Reference to FIG. 2 readily reveals that the second embodiment twin semiconductor laser 20 has a similar structure to that shown in FIG. 1, except that reflective films 23 and 24 are deposited on a portion of the side surfaces 21 and 22 of the laser, which surfaces have been polished or clef parallel to one another to form optical resonators in the manner as illustrated. One reflective film 23 is deposited on the one side face 21 so as to perfectly mask the exposed portion of the first P-N junction 14 on this one side face 21 while the other reflective film 24 is deposited on the other side face 22 so as to perfectly mask the exposed portion of the second junction 15 on this latter side face. Other parts of the laser 20 are the same as those in the laser 10 of FIG. 1, as indicated by the reference numerals used for similar parts.

The manufacturing method for the laser 20 is similar to that for the laser 10 of FIG. 1, except that each of the reflective films is formed by depositing silicon monoxide to a thickness of approximately 2000 A. and silver thereon to a thickness of approximately the same order.

When a 500-ma. pulse current of 1 microsecond duration is conducted from the current control circuit 19 in the direction from the electrode 16 to the electrode 17 with the laser 20 maintained at a temperature of approximately 77° K., laser light emerges from the first junction 14 through the side face 22 in a direction perpendicular to this face, whereas laser light emerges from the second junction 15 through the side face 21 in a direction opposite to that described above. The wavelengths of these laser light emissions are of the same order as those in the previous example of the laser 10.

FIG. 3 shows a twin semiconductor laser of a third embodiment of the invention. This embodiment may be considered a modification of the structure of the laser 10 of FIG. 1 in that the N-type region is partly sandwiched between the two P-type regions, the same reference numerals being used for similar parts in the two figures.

The laser 30 may be constructed by the formation of P-type layers 12 and 13 through a diffusion process in the manner now to be described. Prior to diffusion, a silicon dioxide ($SiO_2$) layer approximately 2 microns in thickness, is formed through a vacuum evaporation process on opposite surfaces of an N-type wafer except those on which diffusion is to take place. As a matter of practice, for instance, a $SiO_2$ film is formed in parallel strips, 250 microns wide and spaced at equal intervals of 250 microns on the one surface of a semiconductor wafer by evaporation. A similar pattern of $SiO_2$ film is formed on the opposite surface so that the two sets of parallel strips intersect at right angles when viewed from the top. The wafer is then subjected to an impurity diffusion process in the same manner as employed for the laser 10 in FIG. 1. From this wafer, a number of pellets in the form of parallelepipeds 0.5×0.5×0.1 mm. on edges are cut out, or cleft. To complete the structure of the laser 30, it is necessary to subject each pellet to the same processes as performed for the laser 10.

When current in the form of pulses of 500 ma. intensity and 1 microsecond duration is conducted from the current control circuit 19 in the direction from the top electrode 16 to the bottom electrode 17, which the semiconductor element 30 kept cool at 77° K., laser light at about 8400 A. of the same direction and opposite in sense, is emitted from the first junction 14 in the direction perpendicular to the side faces 21 and 22. For a reverse current, laser lights at the same wavelength of 8400 A., of the same direction but opposite in sense, are emitted from the second junction 15 through the front and the back side faces 25 and 26 in the direction perpendicular to these faces, which have been finished optically parallel to each other. Each set of laser lights may be made unidirectional if the laser 30 is provided with reflective films in the manner illustrated in FIG. 2.

While a description has been made above in connection with P-N-P type lasers of this invention, it is of course obvious that similar phenomena can be expected from N-P-N type twin semiconductor lasers. Further, the well known III–V compound semiconductor materials such as gallium phosphide (GaP), indium arsenide (InAs), indium phosphide (InP), indium antimonide (InSb), or an alloy made of these alloys may be employed in lieu of gallium arsenide (GaAs). Still further, the kinds of impurities to be doped may be the same as those used for GaAs or may be other well known impurities. Lead telluride (PbTe) or lead selenide (PbSe) may also be used instead of gallium arsenide, as explained by J. Butler in "Journal of the Electro-chemical Society" vol. III, 1964, p. 1150. Laser light wavelengths available from these semiconductors generally range from about 6200 A. to 10,000 A. and are subject to change by the manufacturing and luminescence conditions.

In the manufacture of such twin semiconductor lasers, the utilization of common techniques, materials, etc. as have been developed for ordinary P-N junction lasers is possible without modification, where that is appropriate.

While considerable variations are possible in the manufacture of semiconductor lasers embodying this invention such as concern for example, the dimensions, impurity concentrations, and other conditions, the thickness of the N-type region 11 should be maintained at about 10 microns or greater. This is to prevent occurrence of optical interference between the two laser lights which originate from the two junctions.

Another desirable condition is that the N-type region be less than approximately 1 mm. in thickness from the viewpoint of miniaturization of the twin semiconductor laser. Should the two junctions be separated by more than 1 mm., use of a single optical system would become extremely difficult and, therefore, two sets of optical fibres, optical lenses, optical mirrors, etc. must be prepared for the junctions. This is disadvantageous both economically and spatially.

From what has been described the twin semiconductor lasers according to this invention may be considered as a structure comprising two laser junctions capable of emitting laser light at different wavelengths or two resonators capable of developing outputs in different directions and combined together in opposite polarities.

Of the various twin semiconductor lasers that have been described, the laser 10 shown in FIG. 1 may be employed in frequency-shift light communications as has been indicated. With this type laser, frequency-shift modulation may be superposed on amplitude modulation.

An example of an application of the laser 10 will now be outlined, with reference to the schematic circuit diagram shown in FIG. 4A, and also to FIGS. 4B–4D. Let it first be assumed that an input signal current I such as shown in FIG. 4B flows from the current control circuit 19 to the laser 10 in a direction indicated by the arrow in FIG. 4A. Then luminescence from the laser 10 occurs at the first junction 14 and laser light progresses along an optical path 33, passes through a lens or mirror light focussing system, such as the lens 27, and through the filter 28 for intercepting stray "noises." The light is then reflected by a half mirror 29 for selectively reflecting the laser light at 8550 A. originating from the first junction 14 before becoming incident on a light detector 31. Thus the output signal to be detected as shown in FIG. 4C, emerges from the output side 35 of the detector. When the current is reversed, luminescence at a wavelength of 8800 A. occurs at the second junction 15. In a similar manner this latter laser light is incident on a light detector 32 following a light path 34 which passes through the half mirror 29. Thus the output signal to be detected emerges from the output side 36 of the detector 32 in a manner illustrated by FIG. 4D. It will be apparent therefore, from FIGS. 4B through 4D that positive and negative current flowing in the laser 10 can be separately detected from the different outputs 35 and 36, respectively.

It will be further apparent that similar operation may be expected by using two P-N junction lasers. However, forming two P-N junctions in such close proximity as described above according to this invention is not feasible in the present state of the art, necessitating incidence of two optical signals from the two junctions on the same detector system by the use of two optical systems or half mirrors. Since the two junctions have been formed rather close according to the present invention, a single optical system is sufficient under any circumstance.

Both lasers 20 and 30 shown in FIGS. 2 and 3 can function as a light switch. Since the light intensity may be varied with current intensity in these lasers, either may be used as a multi-stage switch. Accordingly, the lasers according to this invention are very suitable as elements in electronic computers.

Referring next to FIG. 5 a description will now be made of an example of the basic operation of either bidirectional twin semiconductor laser 20 or 30 as a light switch. When current I is conducted through the laser 40 in the direction shown by the arrow, laser light irradiates a light detector 37, following the light path 41. As a result, the internal impedance of the light detector 37 is decreased, whereby the terminals 43 can be shunted. By reversal of the current the light detector 38 is irradiated by the light passing through the optical path 42 to shunt the terminals 44. Thus, by reversing the direction of current flowing in the laser 40, either of the electrically isolated circuits 43 or 44 can be closed.

With the circuit shown in FIG. 5 switching is performed by converting an electrical signal into a light signal, thus enabling feedback from the output to the input to be nullified as compared with electric switches of conventional design. Such a light switch is suitable for application where the coupling due to feedback between a controlling and a controlled circuit is hindered. Furthermore, since the twin semiconductor lasers according to this invention have response speeds less than 0.1 nanosecond, operating speeds of the light switches described are much faster than those of the conventional mechanical switches. Such a light switch may be used, for example, for modulation or demodulation of a time-division signal. Another use is as part of a separation circuit for an FM multiplex signal.

FIG. 6 illustrates an example of the application latter referred to. From the circuit shown and the foregoing description, it will be seen that since the twin laser 40 is bidirectional and when operated by a switching signal causes the output terminals 43 and 44 of the light detectors 37 and 38 to close alternately, an FM multiplex signal $(L+R)$ can be separated into the signals L and R.

It will be appreciated that the invention provides a light switching device having the features of compactness, rapid operating speed, and freedom from feedback by combining a twin semiconductor laser with two light detectors.

While the principles of this invention have been described above in connection with specific embodiments, it is to be clearly understood that the description is made only by way of example and not as a limitation on the scope of this invention and that therefore the scope of the claims includes those modifications and equivalents as will occur to those knowledgeable in the art.

What is claimed is:

1. A twin semiconductor laser comprising
  a crystal of a compound semiconductor material capable of laser action and having at least three conductivity regions therein
  said regions forming two P-N junction planes parallel to each other and spaced from each other at a distance ranging from 10 microns to 1 millimeter,
  said crystal being provided with at least one pair of confronting smooth plane faces constituting a part of the surfaces thereof which faces are optically parallel to each other and perpendicular to each of sand P-N junction planes, and a pair of electrodes provided on at least a part of the surfaces other than said faces of said crystal for applying current through said material in a direction substantially perpendicular to each of said P-N junction planes.

References Cited
UNITED STATES PATENTS 3,305,685 2/1967 Wang _____ 331—94.5 X
3,340,479 9/1967 Ashkin _____ 331—94.5

JEWELL H. PEDERSEN, *Primary Examiner.*

E. BAUER, *Assistant Examiner.*

U.S. Cl. X.R.

317—235; 307—312; 313—108